S. K. ELLIS.

Clasp for Stocking Supporters.

No. 9,506. Reissued Dec. 21, 1880.

WITNESSES

John M. Robertson

B. W. Williams

INVENTOR

Stephen K. Ellis

By his Atty.

Henry W. Williams

UNITED STATES PATENT OFFICE.

STEPHEN K. ELLIS, OF WALTHAM, MASSACHUSETTS.

CLASP FOR STOCKING-SUPPORTERS.

SPECIFICATION forming *part* of Reissued Letters Patent No. 9,506, dated December 21, 1880.

Original No. 137,539, dated April 8, 1873. Application for reissue filed July 2, 1880.

*To all whom it may concern:*

Be it known that I, STEPHEN K. ELLIS, of Waltham, in the county of Middlesex and State of Massachusetts, have invented an Improved Clasp for Stocking-Supporters, of which the following is a full, clear, and exact description, reference being had to the accompanying drawings, making part of this specification, in which—

Figure 1:
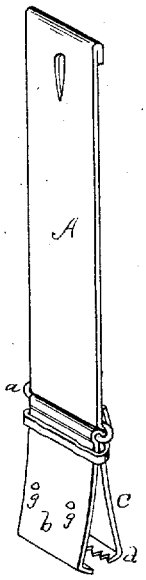
Figure 2:
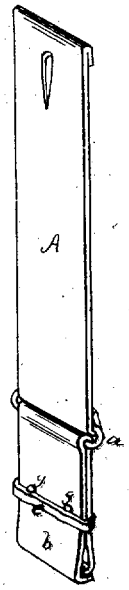
Figure 3:
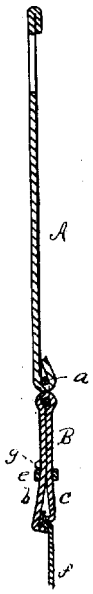

Figure 1 is a perspective view of my improved clasp open. Fig. 2 represents the same closed. Fig. 3 is a longitudinal vertical section through the same.

Stocking-supporters for ladies and children, consisting of straps either attached to a waistband or to some portion of the clothing near the hips, have heretofore been provided with buckles or with button-holes fitting over buttons at the tops of the stockings. The sewing on of these buttons is, however, objectionable, for the reason that they have to be accurately placed at certain points, and are liable to become loose or be torn off in washing, while buckles frequently tear and injure the stockings.

My invention has for its object to overcome these difficulties; and it consists in a cheap, simple, and effective clasp, which can be readily operated to grasp or release the top of the stocking, while it will not tear or injure the same, and will hold it firmly, without any liability of becoming accidentally detached therefrom.

To enable others skilled in the art to understand and use my invention, I will proceed to describe the manner in which I have carried it out.

In the said drawings, A represents one of the side straps of a stocking-supporter, to the lower end of which is attached, by means of a wire loop, *a*, the clasp B. This clasp is composed of two spring-jaws, *b c*, formed of a single piece of sheet metal bent around the loop *a*, and so constructed as to spring apart, as seen in Fig. 1. The bottom of each jaw is bent or turned inwardly at about a right angle, and the upper one of these bent portions is provided with serrations or teeth *d*, as seen in Fig. 1. The plain bent portion overlaps the serrated portion when the jaws are closed, as seen in Fig. 2.

*e* is a slide, also of sheet metal, by operating which the jaws are brought together so as to grasp and hold the top of the stocking *f*, which is confined between the bent portions of the jaws, as seen in Fig. 3, these portions being sufficient to hold the stocking even if the teeth *d* are dispensed with, which may be done, if desired, and to hold it firmly without danger of tearing, as the strain is upon that portion of the fabric which lies between the lapping edges, and at the edge of the lowest one mainly. If the turned up edges did not lap the stocking would, if they were plain, slip, or if they were serrated, tear.

The slide *e* is held down in the position seen in Figs. 2 and 3, by two small projections, *g*, on the outer surface of the jaw *b*, the slide springing over these projections, which serve to prevent its working up and allowing the jaws to open and release their hold upon the stocking. Instead of these two projections *g*, a single one of any suitable shape may be substituted therefor, or a projection on the slide may drop into a hole or depression in one of the jaws.

The above-described clasp is simple, cheap, and effective, and can be used with great advantage as a substitute for buttons or buckles, as it can be easily operated, will not tear or injure the stocking, and when once attached thereto will not become accidentally detached therefrom.

Having thus fully described my invention, what I claim, and desire to secure by Letters Patent, is—

1. The herein-described clasp for stocking-supporters, consisting of the sheet-metal jaws *b c*, both having their lower edges bent, as shown, the bent portion of the jaw *b* overlapping the bent portion of the jaw *c* when the clasp is closed, leaving an appreciable space between the two bent portions for the admission of the fabric of a stocking, and the bent portion of the jaw *c* extending inwardly sufficiently to crowd the fabric against the inner surface of the jaw *b*, the said jaws being provided with means for closing and holding them together, substantially as specified, 2. The within-described clasp for stocking-supporters, consisting of the spring-jaws *b c*, one overlapping the other, in combination with the slide *e* and one or more projections, *g*, or equivalent device, for holding the slide when down, all constructed and operating substantially as set forth.

STEPHEN K. ELLIS.

Witnesses:
HENRY W. WILLIAMS,
GEORGE V. MALLON.